(12) United States Patent
Moussavi

(10) Patent No.: US 8,933,875 B2
(45) Date of Patent: Jan. 13, 2015

(54) VELOCITY STABILIZATION FOR ACCELEROMETER BASED INPUT DEVICES

(75) Inventor: Farshid Moussavi, Oakland, CA (US)

(73) Assignee: Apple Inc., Cupertino, CA (US)

(*) Notice: Subject to any disclaimer, the term of this patent is extended or adjusted under 35 U.S.C. 154(b) by 1716 days.

(21) Appl. No.: 12/182,799

(22) Filed: Jul. 30, 2008

(65) Prior Publication Data

US 2010/0026623 A1  Feb. 4, 2010

(51) Int. Cl.
  G09G 5/00    (2006.01)
  G06F 3/0354  (2013.01)
  G06F 3/038   (2013.01)

(52) U.S. Cl.
  CPC .......... *G06F 3/03543* (2013.01); *G06F 3/0383* (2013.01)
  USPC .......................................... 345/156; 345/163

(58) Field of Classification Search
  USPC .................... 345/156, 158, 163–166; 702/94, 702/150–152
  See application file for complete search history.

(56) References Cited

U.S. PATENT DOCUMENTS

| | | | |
|---|---|---|---|
| 4,787,051 A | 11/1988 | Olson | |
| 5,825,350 A * | 10/1998 | Case et al. | 345/163 |
| 6,744,420 B2 * | 6/2004 | Mohri | 345/157 |
| 2005/0243061 A1 * | 11/2005 | Liberty et al. | 345/158 |
| 2006/0164390 A1 * | 7/2006 | Bianchessi | 345/157 |
| 2009/0153482 A1 * | 6/2009 | Weinberg et al. | 345/163 |

* cited by examiner

*Primary Examiner* — Premal Patel
(74) *Attorney, Agent, or Firm* — Fish & Richardson P.C.

(57) ABSTRACT

A method and apparatus for reducing or eliminating tracking errors associated with accelerometer-based input devices. The method and apparatus calculates a velocity of the input device; determines if the calculated velocity indicates a motion tracking error; and ignores the calculated velocity if the motion tracking error is indicated.

25 Claims, 4 Drawing Sheets

VELOCITY STABILIZATION FOR ACCELEROMETER BASED INPUT DEVICES

FIELD OF THE INVENTION

This invention relates to a method and apparatus for monitoring motion of electronic input devices, and more particularly to a method and apparatus for stabilizing velocity measurements of electronic input devices.

DESCRIPTION OF RELATED TECHNOLOGY

Conventional input devices, such as computer mice, typically employ optical sensors, track wheels or track balls to control the motion of a cursor or other navigational object on a computer display screen. Other types of input devices that measure a force imparted onto the input device typically incorporate one or more accelerometers for sensing acceleration forces exerted on the input device as it is moved by a user. A velocity of the electronic input device may be calculated and estimated by integrating the measured acceleration over time, and a position estimate of the input device may be calculated by integrating its velocity over time. In this way, motion of an accelerometer-based input device may be translated to motion of a cursor or other navigational object on a computer display screen.

A number of problems, however, have been associated with such accelerometer-based input devices. Drift and kickback errors are examples of motion tracking errors that may be caused by errors that accumulate from velocity and/or position estimates calculated from acceleration measurements. Drift errors are typically indicated by a cursor that continues to move in the same direction although a user has stopped moving the input device. Kickback errors are typically exhibited by a cursor that moves in an opposite or different direction from a previous direction even though the user has stopped moving the input device.

Therefore, there is a need for a method and apparatus that can reduce or eliminate tracking errors associated with accelerometer-based input devices.

SUMMARY OF THE INVENTION

Embodiments of the present invention are directed to methods and apparatuses for reducing or eliminating tracking errors associated with accelerometer-based input devices.

In one embodiment, the invention provides a method for reducing or eliminating tracking errors of an electronic input device. The method includes calculating a velocity of the electronic input device, determining if the calculated velocity indicates a motion tracking error, and ignoring the calculated velocity if a motion tracking error is indicated. In one embodiment, the motion tracking error can be a drift or kickback error.

In another embodiment, the invention provides an apparatus for reducing or eliminating tracking errors of an electronic input device. The apparatus includes a motion sensor for calculating a velocity of the electronic input device, and a processing element operable to receive the calculated velocity, and determine if the calculated velocity indicates a motion tracking error, wherein the processor ignores the calculated velocity if the motion tracking error is indicated. In one embodiment, the motion tracking error is a drift or kickback error.

In a further embodiment, the invention provides a computer readable medium for storing computer executable instructions, which include: code for receiving a calculated velocity of the electronic input device; code for determining if the calculated velocity indicates a motion tracking error, and code for ignoring the measure of motion if a motion tracking error is indicated. In one embodiment, the motion tracking error is a drift or kickback error.

BRIEF DESCRIPTION OF THE DRAWINGS

The following drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION OF EXEMPLARY EMBODIMENTS

Figure 1:
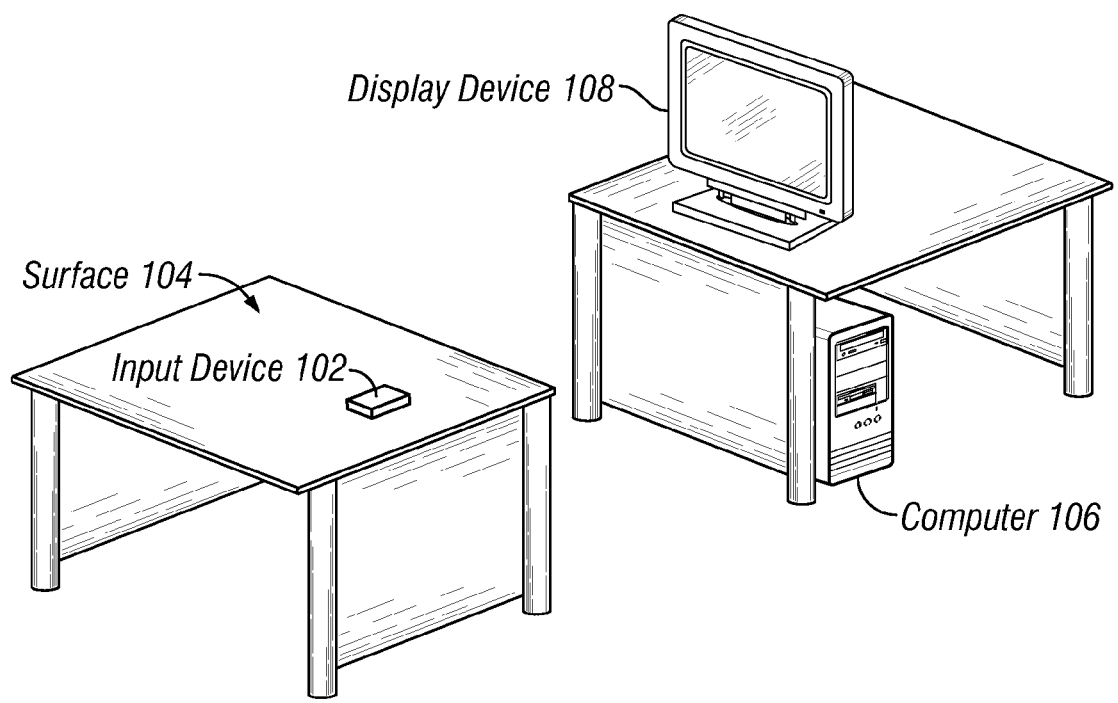
FIG. 1 is a block diagram illustrating a typical environment in which an input device may be used according to one embodiment of the present invention.

In the following description of exemplary embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the present invention.

Embodiments of the invention are directed toward methods and apparatuses for reducing or eliminating motion tracking errors associated with accelerometer-based input devices, or similar forced-based input devices. Although embodiments are described herein in the context of exemplary applications, such as stabilizing velocity for a mouse that controls a cursor on a computer display screen, it is understood that the invention is not limited to such exemplary applications. The methods and apparatuses described herein may also be utilized in other applications with other types of input devices, such as various types of game controllers, for example. It is understood that the embodiments described herein are merely examples and the invention is not limited to these specific examples.

As used herein, the term "application" includes without limitation any unit of executable software that implements a specific functionality or theme. The unit of executable software may run in a predetermined environment; for example, a downloadable Java Xlet™ which runs within the JavaTV™ environment.

As used herein, the terms "receiving device" and "receiver" include without limitation video game consoles, set-top boxes, televisions, personal computers (whether desktop, laptop, or otherwise), iMac™ computers, digital video recorders, communications equipment, terminals, mobile devices such as iPhones™, and display devices.

As used herein, the terms "computer program" and "software" include without limitation any sequence of human or machine cognizable steps that are adapted to be processed by a computer. Such may be rendered in any programming language or environment including, for example, C/C++, Fortran, COBOL, PASCAL, Perl, Prolog, Python, Matlab, assembly language, scripting languages, markup languages (e.g., HTML, SGML, XML, VoXML), functional languages (e.g., APL, Erlang, Haskell, Lisp, ML, F# and Scheme), as well as object-oriented environments such as the Common Object Request Broker Architecture (CORBA), Java™ (including J2ME, Java Beans, etc.).

As used herein, the term "display" includes any type of device adapted to display information, including without limitation cathode ray tube displays (CRTs), liquid crystal displays (LCDs), thin film transistor displays (TFTs), digital light processor displays (DLPs), plasma displays, light emitting diodes (LEDs) or diode arrays, incandescent devices, and fluorescent devices. Display devices may also include less dynamic devices such as printers, e-ink devices, and other similar structures.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "processor," "microprocessor," and "digital processor" refer to all types of digital processing devices including, without limitation, digital signal processors (DSPs), reduced instruction set computers (RISC), general-purpose (CISC) processors, microprocessors, gate arrays (e.g., FPGAs), programmable logic devices (PLDs), reconfigurable compute fabrics (RCFs), array processors, and application-specific integrated circuits (ASICs). Such processors may be contained on a single unitary IC die, or distributed across multiple components.

As used herein, the term "interface" refers to any signal or data interface with a component or network including, without limitation, those compliant with USB (e.g., USB2), FireWire (e.g., IEEE 1394b), Ethernet (e.g., 10/100, 10/100/1000 Gigabit Ethernet, 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), modem, WiFi (802.11a,b,g,n), WiMAX (802.16), PAN (802.15), Bluetooth, or IrDA families.

As used herein, the term "wireless" refers to any wireless signal, data, communication, or other interface including, without limitation, Wi-Fi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

FIG. 1 is a block diagram illustrating a typical environment for use with one exemplary embodiment of the present invention. An input device 102 is initially positioned upon a surface 104 such as a desk or a tabletop. In order to generate input data, a user manipulates the input device relative to the surface 104. In some embodiments, input data may be generated by the input device 102 without the use of buttons.

Note that in FIG. 1, the surface 104 is depicted as being flat or substantially flat; however, this is not strictly necessary according to many embodiments of the present invention. Also note that in many variants, the surface 104 need not necessarily be situated beneath the input device 102. For example, the surface 104 may be tilted, situated above the input device 102, or vertically oriented. Also note that in certain embodiments, multiple surfaces 104 can be utilized.

A receiving device (such as the depicted computer 106) is adapted to receive input data generated from the input device 102. In principal embodiments, the receiving device comprises at least one interface adapted to receive the generated data. In many variants, the input device 102 is physically connected to the receiving device via one or more communication links (such as via a serial bus cable). In other variants, the input device 102 is adapted to wirelessly transmit input signals to the receiving device 106.

A display device 108 in electrical communication with the receiving device is adapted to display a navigational object upon its display screen (for example, a pointer, cursor, selector box, or other such indicator). During principal operation, when the user manipulates the input device 102 relative to the surface 104, the input signals are received at the computer 106 and the navigational object responds according to the user's input.

Figure 2:
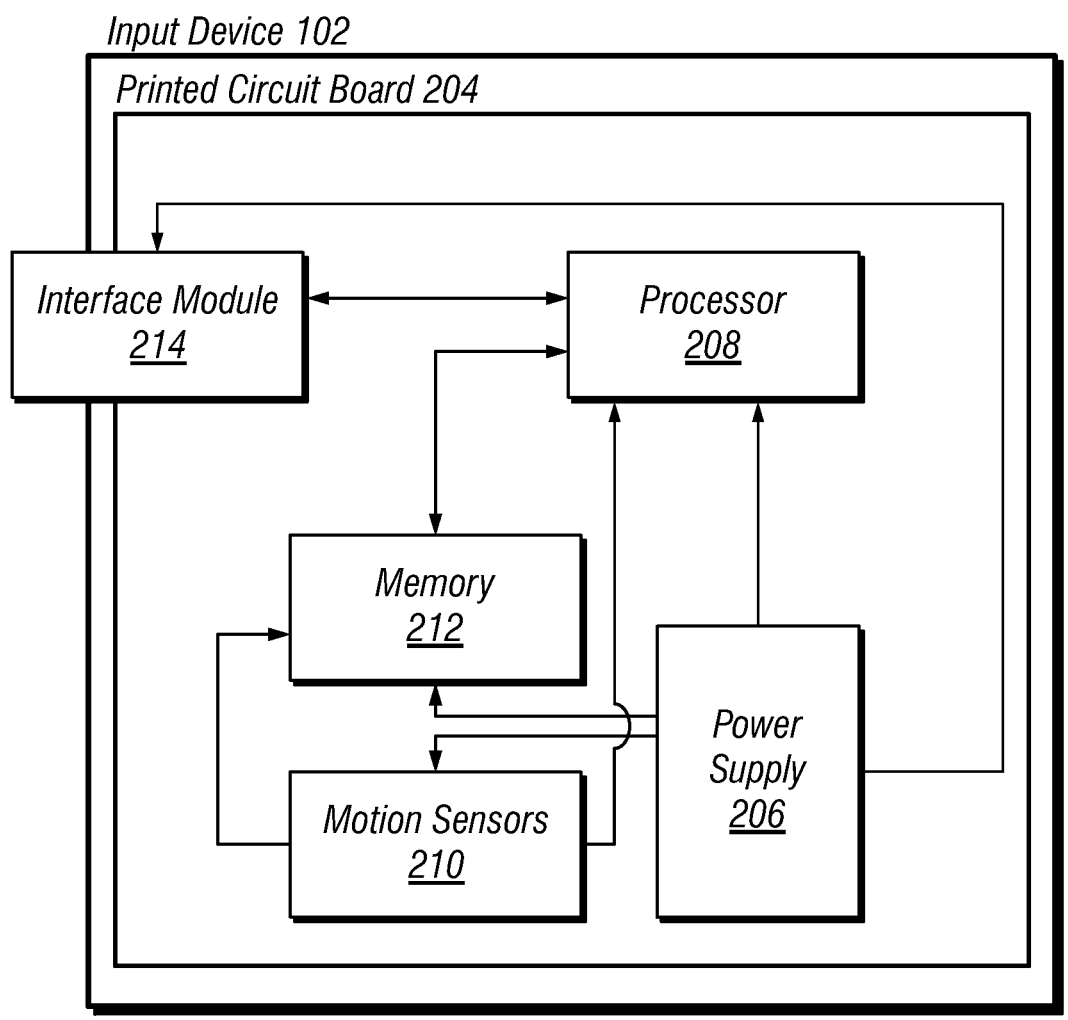
FIG. 2 is a block diagram of a modular arrangement of an input device according to one embodiment of the present invention.

FIG. 2 is a block diagram of a modular arrangement of the input device 102 according to one embodiment of the present invention. The input device 102 houses a printed circuit board 204 comprising electrical leads which enable various modules to communicate with other connected modules.

A power supply 206 provides a source of power to modules electrically coupled to the printed circuit board 204. In some embodiments, power is supplied externally from one or more conductive wires, for example, as by a power cable or serial bus cable. In other embodiments, a battery may be used as a source of power.

A memory 212 comprises any type of module adapted to enable digital information to be stored, retained, and retrieved. Additionally, the memory 212 may comprise any combination of volatile and non-volatile storage devices, including without limitation RAM, DRAM, SRAM, ROM, and/or flash memory. Note also that the memory 212 may be organized in any number of architectural configurations, such as registers, memory buffers, main memory, mass storage, and/or removable media. In some embodiments, the memory 212 is adapted to store velocity thresholds and/or applicable ranges for each measured parameter, and code or algorithms for performing the operations described herein. In alternative embodiments, this data may be stored in a remote memory source (e.g., the hard drive of the computer 106), and the input device 102 merely transmits raw data to the computer 106 for processing.

One or more processors 208 are adapted to execute sequences of instructions by loading and storing data to the memory 212. These instructions may include, for example, instructions for data conversions, formatting operations, communication instructions, and/or storage and retrieval operations. Additionally, the processors 208 may comprise any type of digital processing devices including, for example, digital signal processors, reduced instruction set computers, general-purpose processors, microprocessors, gate arrays, programmable logic devices, reconfigurable compute fabrics, array processors, and application-specific integrated circuits. Note also that the processors 208 may be contained on a single unitary IC die or distributed across multiple components. In alternative embodiments, the processor(s) 208 may be located in the receiving device and configured to receive data from motion sensors 210 via an interface module 214 for processing.

The interface module 214 enables data to be transmitted and/or received via one or more communication protocols or networks. In one embodiment, data transmitted to a receiving device is first packetized and processed according to a standardized protocol. In many variants, the standardized protocol may include a plurality of network layers such that each layer provides services to the layer above it and receives services from the layer below it. The interface module 216 may accommodate any wired or wireless protocol including, without limitation, USB, FireWire, Ethernet, Gigabit Ethernet, MoCA, radio frequency tuners, modems, WiFi, Blutooth, WiMax, and/or Infrared Data Association.

One or more motion sensors 210 enable the input device 102 to determine velocity values during a given instant, or alternatively, over a given period of time. Various types of motion sensors such as accelerometers, gyroscopes, etc. may be incorporated as motion sensor 210. In one embodiment, the motion sensors 210 comprise one or more accelerometers adapted to detect the current acceleration of the input device 102. In this embodiment, velocity values are determined by logic adapted to integrate a detected acceleration quantity. In one embodiment, the motion sensor 210 includes at least one micro electromechanical system (MEMS) accelerometer. Optionally, the micro electromechanical system may comprise a dedicated microprocessor adapted to interact with one or more accelerometers that sense acceleration forces exerted on the input device 102.

Figure 3:
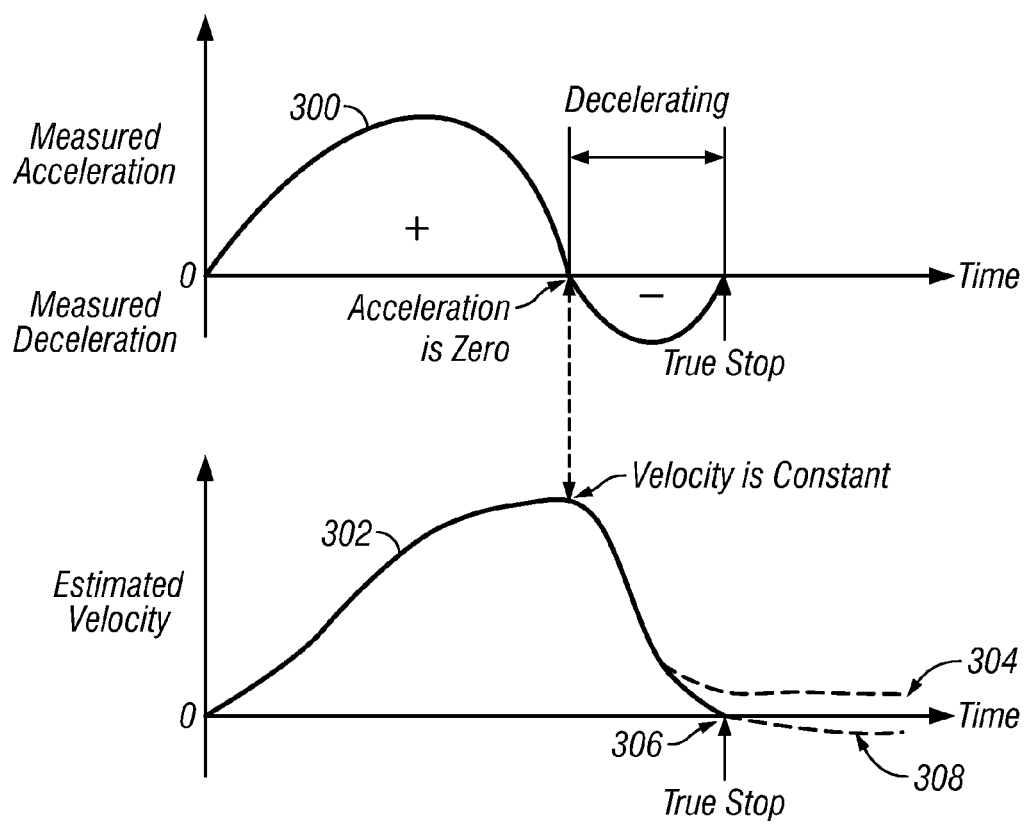
FIG. 3 illustrates acceleration and velocity curves as a function of time, along with potential drift and kickback errors due to errors in calculating velocity from acceleration forces measured by an electronic input device.

FIG. 3 illustrates exemplary acceleration and velocity curves 300 and 302, respectively, as functions of time. In one embodiment, the acceleration curve 300 represents acceleration sensed by a MEMS accelerometer as a user moves the input device 102 (e.g., a mouse) containing the accelerometer. As shown in FIG. 3, the acceleration curve 300 indicates a period of positive acceleration, a period or point of zero acceleration (i.e., constant velocity), followed by a period of negative acceleration (i.e., deceleration). As discussed above, the measured acceleration and deceleration values can be integrated (e.g., accumulated) to calculate an estimated velocity of the electronic input device as indicated by velocity curve 302.

As shown in FIG. 3, the velocity curve 302 indicates a period of increasing velocity during positive acceleration, a period of constant velocity corresponding to zero acceleration, and decreasing velocity during deceleration. When acceleration reaches zero after a period of deceleration, this typically indicates that the input device has come to rest (i.e., a "true stop"). In this situation, a cursor or other navigational object on a display screen that is controlled by motion of the input device should also come to a complete stop. However, due to errors that can accumulate when calculating velocity from acceleration measurements, the calculated velocity may erroneously indicate a small positive velocity as indicated by dashed line 304, which results in the cursor continuing to drift across the display screen, even though the input device 102 has stopped moving. Alternatively, the calculated velocity may cross a zero velocity threshold 306 (referred to herein as a "zero crossing") and indicate a false negative velocity as indicated by dashed line 308, which results in the cursor moving or "kicking back" in a reverse or different direction, even though the mouse has stopped moving.

Figure 4:
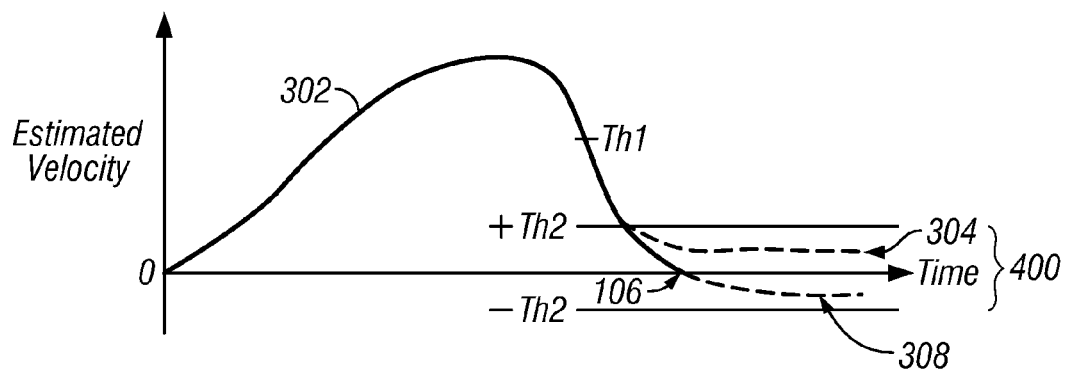
FIG. 4 illustrates the velocity curve of FIG. 3 superimposed with an error threshold zone, in accordance with one embodiment of the invention.

FIG. 4 illustrates the velocity curve 302 of FIG. 3 superimposed with an error threshold zone 400, in accordance with one embodiment of the invention. As discussed further below, following a period of decreasing velocity, if a calculated velocity (e.g., a moving average velocity between time t1 and t2) falls below a first threshold (Th1), the present invention checks to see if a calculated velocity at time t2 (or other point or period of time within dashed line 304) falls within the error threshold zone 400. If the calculated velocity at time t2, for example, is less than Th2, such velocity is determined to be a drift error and the calculated velocity indicated by dashed line 304, or a portion thereof, is ignored by automatically forcing the calculated velocity value to zero. Otherwise, the calculated velocity is deemed to be a legitimate slow movement of the input device that results in corresponding movement of the cursor across a display screen.

If the velocity curve 302 moves from a positive value to a negative value, indicating that the input device has reversed or changed direction, the present invention checks to see if a calculated velocity at time t2 (or other point or period of time within dashed line 308) falls within the error threshold zone 400. If the calculated velocity at time t2, for example, has a magnitude less than Th2, the calculated velocity is ignored as being a kickback error. In this instance, the calculated velocity indicated by dashed line 308, or a portion thereof, is automatically forced to zero and cursor motion is halted. Otherwise, if the calculated velocity is greater than the error threshold (Th2), it is considered to be a legitimate motion of the input device, which results in corresponding motion of the cursor. It should be understood that the magnitude of the threshold values (Th1 and Th2) may be set at any desired level depending on a variety of system design and performance criteria and/or different applications of the input device of the present invention.

Figure 5:
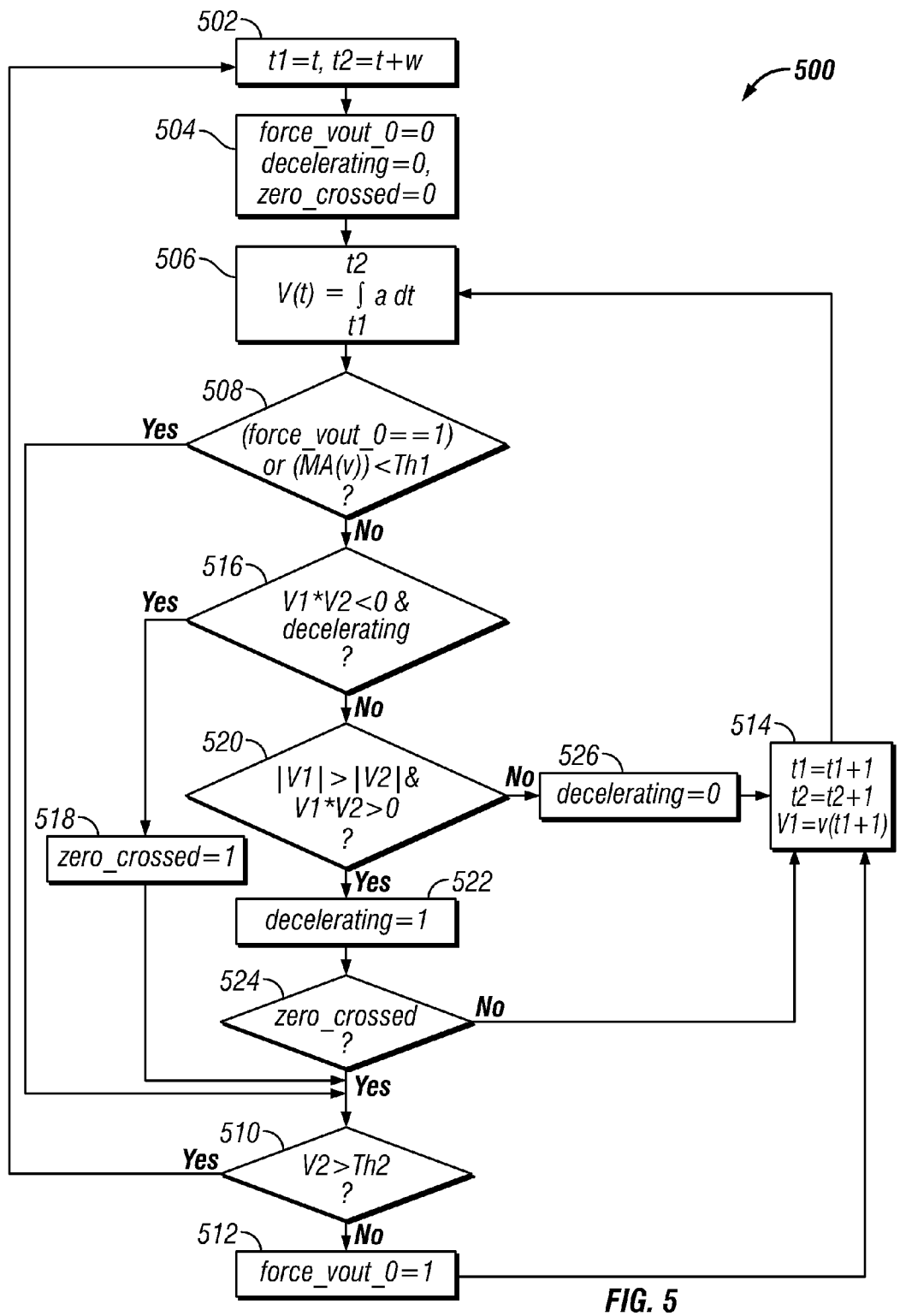
FIG. 5 is a flow diagram of a velocity stabilization process, in accordance with one embodiment of the invention.

FIG. 5 illustrates an exemplary flow diagram of a velocity stabilization process 500, in accordance with one embodiment of the invention. In this embodiment, process 500 monitors velocity values calculated from acceleration measurements and thereafter determines if the velocity values are indicative of tracking errors. If tracking errors, such as drift of kickback errors are indicated, the velocity values are ignored by setting them to zero. The various tasks performed in connection with process 500 may be performed by hardware, software, firmware, or any combination thereof. It should be appreciated that process 500 may include any number of additional or alternative tasks, the tasks need not be performed in the illustrated order, and process 500 may be incorporated into a more comprehensive procedure or process having additional functionality not described in detail herein.

The process 500 begins by initializing two time variables t1 and t2 to define a time or sampling period in which velocities are calculated and monitored for potential errors. In one embodiment, variable t1 is set to a current point in time (t) and variable t2 is set to a predetermined time in the future (t+w), where w is a predetermined time or sampling window (task 502). In alternative embodiments, time t may be a predetermined point in time in the past or in the future. The window size w may be varied depending on device memory limitations, processing capacity and performance limitations, and/or various other factors. The window size w may further be varied and adapted in accordance with various applications and/or operating environments. In one embodiment, a window size of w=10 to 20 samples may be used.

Next, three variables or control flags, labeled as "force_vout_0," "decelerating," and "zero_crossed," are initialized to "0" (task 604). Setting these flags to "0" represents a "no" or negative event condition whereas setting these flags to "1" indicates a "yes" or positive condition. In one embodiment, these control flags are implemented as bits of a control register contained within the input device 102 (FIGS. 1 and 2) and coupled to the processor 208.

The force_vout_0 flag indicates if the calculated velocity of the electronic input device (e.g., mouse 400) is to be used or ignored. If force_vout_0 is set to "1", then any calculated velocity is automatically set to zero and hence ignored. If set to "0", the calculated velocity is deemed to be a legitimate value representative of actual movement of the input device 102 and hence used to move a cursor or other navigational object.

The decelerating flag is an internal flag or variable set to indicate if the electronic input device is decelerating. The decelerating flag is set to "1" if velocity calculations indicate the electronic input device is decelerating (i.e., slowing down). Otherwise, the decelerating flag is set to "0."

The zero_crossed flag is set to indicate if the electronic input device 102 appears to be moving in an opposite or different direction than a previous direction as indicated by velocity calculations. For example, if the electronic input device is moving in a positive direction and subsequently reverses direction, its velocity value will change from a positive value to a negative value and, hence, cross a zero velocity value, referred to herein as a "zero-crossing." If the zero_crossed flag is set to "1", then a zero-crossing has occurred, and if it is set to "0", this indicates a zero crossing has not occurred.

A velocity v(t) for the input device is calculated by integrating measured acceleration from time t1 to t2 (task 506). As mentioned above, in one embodiment, acceleration of the input device is measured by a MEMS accelerometer contained within the input device. Next, the process determines whether the force_vout_0 flag has been previously set to 1 (e.g., in a previous iteration of the process 500) or whether a value associated with v(t) (e.g., a moving average of v(t) designated as "MA(v)" in FIG. 5) is less than a first predetermined threshold (Th1) (task 508). If either of these conditions are met, the process determines if a recent or last measured velocity V2 (e.g., v(t2)) is greater than a second predetermined threshold value (Th2) (task 510). If it is determined that V2 is greater than the second threshold Th2, the process starts over and initializes a new time or sampling window wherein new velocity values are calculated and analyzed (task 502).

If at task 510 it is determined that V2 is not greater that Th2, a drift error is indicated by setting the force_vout_0 flag to 1 (task 512). When force_vout_0=1, all or a predetermined portion of the velocity calculations v(t) from time t1 to t2 are forced to 0 such that the motion of a cursor or other navigational object is halted, as described above. In this way, velocity values which are determined to be the result of accumulating calculation errors (i.e., tracking errors) are ignored. Next, the process continues by incrementing t1 and t2 by a predetermined unit of time (e.g., one or more clock cycles) to obtain new t1 and t2 values (task 514) and setting V1=v(t1+1), where t1+1 indicates a new starting point by incrementing the previous time t1 by a predetermined unit of time.

If one or both of the conditions at task 508 are not satisfied, the process next determines if the velocity calculations satisfy two conditions, namely, whether a zero crossing has occurred (i.e., V1*V2<0?) and the input device is decelerating (task 516). If both of these conditions are satisfied, the zero_crossed flag is set to 1 (task 518), which indicates that the motion of input device has reversed or changed direction from a previous direction. Thereafter, the process determines whether this change in direction represents actual motion of the input device or whether it is likely attributable to a kickback error by checking whether V2 is greater than Th2 (task 510). If V2 is greater than Th2, the calculated velocity values are deemed to be legitimate and the process returns to task 502, as described above. If V2 is not greater than Th2, the force_vout_0 flag is set to 1 (task 512) and all or a portion of the calculated velocity v(t) is ignored as described above. Thereafter, the process proceeds to task 514, as described above.

If both conditions at task 516 (i.e., V1*V2<0 and decelerating) are not satisfied, the process then determines whether another pair of conditions are satisfied, namely, whether the input device is decelerating (|V1|>|V2|?) but has not changed directions (V1*V2>0?) (task 520). If both these conditions are met, the deceleration flag is set to 1 (task 522), indicating that a deceleration of the input device has been detected. Next, the process inquires whether there has been a zero crossing (i.e., direction change) in a previous iteration of process 500 (task 524). If so, the process proceeds to task 510 and continues from there as described above. If no previous zero crossing is detected at task 524, the process proceeds to task 514 and continues from there as described above.

If both conditions at task 520 (i.e., |V1|>|V2| and V1*V2>0) are not satisfied, the deceleration flag is set to 0 (task 526) and the process proceeds to task 514 and continues from there as described above. Note that the decelerating flag may have been set to 1 during a previous iteration of process 500.

Thus, as described above with respect to the exemplary process depicted in FIG. 5, the invention provides a method and apparatus for identifying potential tracking errors from calculated measures of motion of an electronic input device. If such tracking errors are identified, the corresponding measures of motion (e.g., velocity calculations) are set to zero and, hence, ignored, thereby stopping further motion of a cursor or other navigational object controlled by the input device. In this way, tracking errors such as drift and kickback errors associated with previous accelerometer-based input devices can be substantially reduced or eliminated.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method performed by one or more processors for compensating for motion tracking errors associated with an electronic input device, the method comprising the following operations:
   determining a velocity of the electronic input device is decelerating;
   in response to the decelerating velocity, determining an initial time when a magnitude of a velocity of the electronic input device decreases below a velocity threshold;
   in response to satisfying the velocity threshold, determining, at a subsequent time, if a magnitude of a calculated velocity of the electronic input device remains within a predefined range defined by the velocity threshold; and
   ignoring the calculated velocity as a motion tracking error if the magnitude of the calculated velocity is within the predefined range.

2. The method of claim 1 wherein the motion tracking error comprises a drift error.

3. The method of claim 2 wherein the act of determining comprises:
   calculating an average magnitude of the velocity of the input device for a given time period;
   determining if the average velocity decreases below the velocity threshold; and
   determining if the average magnitude of the calculated velocity at the end of the given time period exceeds a second threshold, wherein if the magnitude does not exceed the second threshold, the drift error is indicated.

4. The method of claim 1 wherein the motion tracking error comprises a kickback error.

5. The method of claim 4 wherein the act of determining comprises:
   determining if the input device has changed direction; and
   if it is determined that the input device is decelerating and has changed direction, determining if a magnitude of the calculated velocity of the input device is greater than a predetermined threshold, wherein if the magnitude is not greater than the threshold, the kickback error is indicated.

6. The method of claim 1 wherein the calculated velocity is calculated from acceleration measurements.

7. An electronic input device, comprising:
   a motion sensor for generating a signal indicative of a velocity of the electronic input device; and
   a processor, coupled to the motion sensor, operable to receive the signal, determine a velocity of the electronic input device is decelerating, in response to the decelerating velocity, determine, based on the received signal, an initial time when a magnitude of a velocity of the electronic input device decreases below a velocity threshold, and determine, at a subsequent time, if a magnitude of a calculated velocity of the electronic input device remains within a predefined range in response to satisfying the velocity threshold, wherein if the magnitude of the calculated velocity is within the predefined range the processor is further operable to set the velocity of the input device to zero as a motion tracking error.

8. The electronic input device of claim 7 wherein the motion tracking error comprises a drift error.

9. The device of claim 8 wherein the processor is further operable to:
   calculate an average magnitude of the velocity of the input device for a given time period;
   determine if the average velocity decreases below the velocity threshold; and
   determine if the average magnitude of the calculated velocity at the end of the given time period exceeds a second threshold, wherein if the magnitude does not exceed the second threshold, the drift error is indicated.

10. The device of claim 7 wherein the motion tracking error comprises a kickback error.

11. The device of claim 10 wherein the processing element is further operable to:
    determine if the velocity of the input device has changed direction; and
    if it is determined that the input device is decelerating and has changed direction, determine if a magnitude of a calculated velocity of the input device is greater than a predetermined threshold, wherein if the magnitude is not greater than the threshold, the kickback error is indicated.

12. The device of claim 7 wherein the motion sensor comprises a MEMS accelerometer.

13. A system for tracking the motion of an electronic input device, comprising:
    a motion sensor contained within a housing of the electronic input device for generating a signal indicative of a velocity of the electronic input device;
    a processor, coupled to the motion sensor, operable to receive the signal, determine a velocity of the electronic input device is decelerating, in response to the decelerating velocity, determine, based on the received signal, an initial time when a magnitude of a velocity of the electronic input device decreases below a velocity threshold, and determine, at a subsequent time, if a magnitude of a calculated velocity of the electronic input device remains within a predefined range in response to satisfying the velocity threshold, and to ignore the velocity as a motion tracking error if the magnitude of the calculated velocity is within the predefined range;
    a computing device having a display screen for displaying an object controlled by the input device; and
    a peripheral interface for coupling the electronic input device to the computing device.

14. The system of claim 13 wherein the processor is contained within the housing of the electronic input device.

15. The system of claim 13 wherein the processor is contained within a housing of the computing device.

16. The system of claim 13 wherein the motion tracking error comprises a drift error.

17. The system of claim 16 wherein the processor is further operable to:
    calculate an average magnitude of the velocity of the input device for a given time period;
    determine if the average velocity decreases below the velocity threshold; and
    if the average magnitude of the velocity is below the velocity threshold, determine if the average magnitude of the calculated velocity at the end of the given time period exceeds a second threshold, wherein if the magnitude does not exceed the second threshold, the drift error is indicated.

18. The system of claim 13 wherein the motion tracking error comprises a kickback error.

19. The system of claim 18 wherein the processor is further operable to:
    determine if the input device has changed direction; and
    if it is determined that the input device is decelerating and has changed direction, determine if a magnitude of a calculated velocity of the input device is greater than a predetermined threshold, wherein if the magnitude is not greater than the threshold, the kickback error is indicated.

20. The system of claim 13 wherein the motion sensor comprises a MEMS accelerometer.

21. A computer readable product encoded on a tangible, non-transitory storage medium, the product comprising executable instructions for causing one or more processors to perform operations comprising:
   receiving a signal indicative of a velocity of the electronic input device;
   determining a velocity of the electronic input device is decelerating;
   in response to the decelerating velocity, determining an initial time when a magnitude of the velocity of the electronic input device decreases below a velocity threshold;
   in response to satisfying the velocity threshold, determining, at a subsequent time, if the magnitude of the velocity of the electronic input device remains within a predefined range defined by the velocity threshold; and
   ignoring the velocity as a motion tracking error if magnitude of the velocity is within the predefined range.

22. The computer readable product of claim 21 wherein the motion tracking error comprises a drift error.

23. The computer readable product of claim 22 wherein the act of determining comprises:
   calculate an average magnitude of the velocity of the input device for a given time period;
   determine if the average velocity decreases below the velocity threshold; and
   if the average magnitude of the velocity is below the velocity threshold, determine if the average magnitude of the calculated velocity at the end of the given time period exceeds a second threshold, wherein if the magnitude does not exceed the second threshold, the drift error is indicated.

24. The computer readable product of claim 21 wherein the motion tracking error comprises a kickback error.

25. The computer readable product of claim 24 wherein the act of determining comprises:
   determining if the input device has changed direction; and
   if it is determined that the input device is decelerating and has changed direction, determining if a magnitude of a calculated velocity of the input device is greater than a predetermined threshold, wherein if the magnitude is not greater than the threshold, the kickback error is indicated.

* * * * *